United States Patent
Holmes

[15] 3,657,081
[45] Apr. 18, 1972

[54] PROCESS FOR RECOVERY OF METALS

[72] Inventor: W. Church Holmes, 100 South St., Sausalito, Calif. 94965

[22] Filed: Nov. 9, 1970

[21] Appl. No.: 88,088

[52] U.S. Cl. .........................................................204/105 R
[51] Int. Cl. ....................................C22b 31/00, B01k 1/00
[58] Field of Search ...............................................204/105 R

[56] References Cited

UNITED STATES PATENTS

| | | | |
|---|---|---|---|
| 2,331,395 | 10/1943 | Holmes.............................. | 204/105 R |
| 3,382,163 | 5/1968 | Czaloun ............................ | 204/105 R |

FOREIGN PATENTS OR APPLICATIONS

| | | | |
|---|---|---|---|
| 14,235 | 1889 | Great Britain ..................... | 204/105 R |
| 18,966 | 1892 | Great Britain ..................... | 204/105 R |

Primary Examiner—F. C. Edmundson
Attorney—Naylor & Neal

[57] ABSTRACT

The process of recovering antimony from stibnite concentrate and other minerals or products containing the same which comprises contacting the concentrate with a solution of an alkali metal sulphide in a leaching circuit, electrolyzing the resultant pregnant solution in a diaphragm cell by utilizing said solution as the catholyte and a solution of the barren, or stripped catholyte and caustic alkali as the anolyte, whereby oxidation products of sulphide sulphur are formed in the anolyte, treating all or part of the resulting oxidized anolyte with chlorine gas for the precipitation of its contained antimony and sulphide sulphur prior to its discard, recovering the antimony content of the precipitate and returning the same to the leaching circuit, and removing sufficient sulphur in the process as sodium sulphate and elemental sulphur to maintain the sulphide sulphur content of the leaching solution at a predetermined level.

7 Claims, No Drawings

PROCESS FOR RECOVERY OF METALS

This invention is an improvement upon a prior invention, Electrolytic Recovery of Metals, as described in U.S. Pat. No. 2,331,395, dated Oct. 12, 1943, and it relates more particularly to the recovery of metals known as the tin group, namely mercury, arsenic, antimony and tin which occur primarily associated with sulphur. The process is particularly adapted for the recovery of antimony from the ores and concentrates of the mineral stibnite, $Sb_2S_3$, but may also be applicable to the recovery of the other named metals by the process described in the prior patent referred to.

In the practice of the prior invention for the recovery of antimony from the concentrate of an argentiferrous tetrahedrite mineral, a silver-copper-antimony sulphide, by leaching in a concentrated sodium sulphide solution, electrolyzing the pregnant solution in the catholyte compartment of a diaphragm cell in which the anolyte solution is a mixture from the electrolysis of barren solution and fresh caustic soda, regenerating the oxidized solution, particularly the anolyte, with barium sulphide for return to the leaching circuit, the net sodium and sulphur contents of the plant solutions are maintained essentially in balance due to both sodium and sulphur being rejected from the circuit by controlled repulping and washing of the substantial weight, relative to the antimony dissolved, of the insoluble residue containing the silver and copper values.

In the practice of the prior invention for the recovery of antimony from the type of concentrate referred to in the preceding paragraph, the equivalent of approximately 1 pound of sodium sulphide was discarded with the insoluble residue per pound of antimony recovered and the sodium content of the discarded salt was replaced by an equivalent amount of caustic soda added to the fresh anolyte make-up circuit. Thus the equivalent of the approximately four-tenths of a pound of sulphur dissolved in the leaching cycle, per pound of antimony recovered, ended up in the filtered leach residue which was further treated by pyrometallurgical means for the recovery of its silver and copper values.

This will not be the case should an ore or concentrate of the antimony sulphide mineral, stibnite, be leached in an alkaline sulphide solution and, following the practice of the prior invention, the pregnant solution be electrolyzed in the catholyte compartment of a diaphragm cell in which the solution in the anolyte compartment of the cell is a mixture of barren solution and fresh caustic soda, and the oxidized solutions, particularly the anolyte, be regenerated with barium sulphide for return to the leaching circuit. There will be a build up in the plant solutions, ignoring filtration losses and assuming complete regeneration in the barium sulphide circuit of the oxidized sodium sulphur salts, of more or less 1 pound of sodium sulphide per pound of antimony recovered, the sodium fraction thereof having been added as caustic soda to the anolyte make-up circuit.

This can be compensated for by the discarding of fouled anolyte. However, since experience indicates that under the conditions of electrolyzing the alkaline sulphide solutions of antimony in the diaphragm cell there is an appreciable migration of the $SbS_3^-$ ion from the catholyte to the anolyte compartment of the cell, the discarding of the fouled anolyte would entail substantial losses of antimony in addition to the fact that the discarding of solutions containing both antimony and an alkaline sulphide would be undesirable from a pollution standpoint.

Another way of maintaining the sulphur balance of the solutions realized from leaching a stibnite ore or concentrate in an alkaline sulphide solution and electrolyzing in a diaphragm cell, using the pregnant solution as the catholyte and a combination of a portion of the barren solution and caustic soda as the anolyte, would be to crystallize sufficient of the oxidized sodium salts, such as sodium sulphate, in the fouled anolyte by cooling, using evaporation of the fouled anolyte, if necessary, and then regenerating the solution containing the unprecipitated oxidized sulphur salts of the fouled anolyte with barium sulphide to convert these oxidized salts to the sulphide condition for return to the leaching circuit and rejecting sufficient sodium sulphate in the process to maintain the sodium and sulphide sulphur balances in the plant solutions at the desired levels.

The present invention is an improvement over each of the above methods of control and involves the use of chlorine gas, $cl_2$, for the treatment of the fouled anolyte, either following prior regeneration of all or part of the fouled anolyte with barium sulphide, or without utilizing this step in the process.

Specifically the process includes the leaching of the stibnite ore or concentrate or other material in a finely divided condition in an alkaline sulphide solution. The alkaline sulphide can be either the mono-sulphide or polysulphide or a mixture of both, of sodium, potassium or ammonia. The use of sodium sulphide results in the solution of the $Sb_2S_3$ according to the reaction:

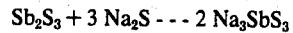

$$Sb_2S_3 + 3\ Na_2S \text{---} 2\ Na_3SbS_3$$

An excess of sodium sulphide will be maintained in the solution over and above the amount required for the above reaction.

The pregnant solution from the leaching step carrying a preferred content of about 60 grams per liter of antimony, although this content may vary both sides of this concentration, is electrolyzed in the catholyte compartment of a diaphragm cell. As the cycle is in operation, the anolyte will be made up of a mixture of barren solution and caustic soda to have a preferred alkalinity in the range of 250 grams per liter as NaOH, although this concentration can also be varied substantial amounts to each side of that value.

As the electrolysis proceeds, the catholyte will be enriched in sodium hydroxide due to migration of sodium ions from the anolyte to the catholyte and it will be depleted in sulphur ions due to their migration from the catholyte to the anolyte compartment. Assuming no mixing of the catholyte and anolyte and a 100 percent current efficiency, a perfect condition that cannot be realized in practice, the catholyte will be enriched by approximately 1.0 pounds per ton of NaOH and depleted by approximately 0.4 pounds per ton of sulphur per pound of antimony deposited. However, the transfer of sodium and sulphur ions between the catholyte and anolyte will be of this order of magnitude.

The sulphide sulphur compounds are oxidized in the anolyte solution through the various stage of polysulphide, thiosulphate, sulphite and sulphate, and the alkalinity of the solution is depleted due in part to this oxidation and in part to the migration of sodium ions to the catholyte.

During the electrolysis a portion of the antimony of the catholyte solution, which hydrolyzes as $SbS_3\text{---}$, will also migrate to the anolyte, the rate of such migration diminishing as the antimony content of the catholyte is depleted by precipitation of the metal.

As the effective alkalinity of the anolyte drops to 125 – 150 grams per liter as NaOH, a portion of it is withdrawn and replaced with a fresh solution. The withdrawn portion is treated with chlorine gas to precipitate any remaining sulphide sulphur as elemental sulphur and to precipitate the antimony as an oxide compound.

The antimony compound is separated from the precipitated elemental sulphur by any convenient means, as for example, by washing with steam in a filter press, and the recovered antimony compound is returned to the leaching circuit.

Should there be an economical advantage in recovering the sulphur associated with the stibnite, the oxidized sulphur compounds of the fouled anolyte are regenerated to the sulphide condition by the above-described barium sulphide treatment and the regenerated solution is then treated with chlorine gas for precipitation of antimony and elemental sulphur.

Should plant operating conditions warrant, a portion of the fouled anolyte may be regenerated with barium sulphide for return to the leaching circuit and a portion treated with chlorine gas for the precipitation of antimony and elemental sulphur, prior to its discard.

I claim as my invention:

1. The process of recovering antimony from stibnite concentrate which comprises contacting said concentrate with a solution of an alkali metal sulphide in a leaching circuit, electrolyzing said solution in a diaphragm cell by utilizing said solution as the catholyte and by utilizing a solution of the barren or stripped catholyte and caustic alkali as the anolyte, whereby oxidation products of sulphide sulphur are formed in the anolyte, treating at least a portion of the resulting oxidized anolyte with chlorine gas to precipitate antimony and sulphur prior to its discard, recovering the antimony from the precipitate and returning it to the leaching circuit, and rejecting sufficient sulphur in the process to maintain the sulphide sulphur concentration of the leaching solution at a predetermined level.

2. The process of claim 1 including regenerating the oxidized sulphur compounds in the fouled anolyte back to the sulphide state by treatment with barium sulphide, treating at least a portion of the regenerated sulphide solution with chlorine gas to precipitate antimony and elemental sulphur prior to its discard, separating the antimony from the elemental sulphur for return to the leaching circuit, and removing sufficient sulphur from the regenerated solution to maintain the sulphide sulphur content of the leaching solution at a predetermined level upon the addition thereto of that portion of the regenerated solution not subjected to the chlorine gas treatment.

3. The process of claim 1 including the treatment of a portion of the fouled anolyte with barium sulphide to regenerate the oxidized sulphur salts back to the sulphide state for return to the leaching circuit and treating a portion of the fouled anolyte with chlorine gas to precipitate its contained antimony and sulphide sulphur as an oxide compound of antimony and elemental sulphur prior to discarding the chlorinated solution, separating the precipitated antimony from the elemental sulphur for return to the leaching circuit and removing sufficient sulphur by the chlorine gas treatment to maintain the sulphide sulphur concentration of the leaching solution at a predetermined level by the addition thereto of that portion of the fouled anolyte regenerated by barium sulphide and not subjected to the chlorine gas treatment.

4. The process of recovering antimony from minerals or products containing the same, which comprises contacting said minerals or products with a solution of an alkali metal sulphide in a leaching circuit, electrolyzing said solution in a diaphragm cell by utilizing said solution as the catholyte and by utilizing a solution of the barren or stripped catholyte and caustic alkali as the anolyte, whereby oxidation products of sulphide sulphur are formed in the anolyte, treating at least a portion of the resulting oxidized anolyte with chlorine gas to precipitate its contained antimony and sulphide sulphur prior to its discard, recovering the antimony from the precipitate for return to the leaching circuit, and rejecting sufficient sulphur in the process to maintain the sulphide sulphur content of the leaching solution at a predetermined level.

5. The process of claim 4 including regenerating the oxidized sulphide sulphur compounds of the fouled anolyte back to the sulphide state by treatment with barium sulphide treating at least a portion of regenerated solution with chlorine gas to precipitate antimony and elemental sulphur, separating the antimony from the elemental sulphur for return to the leaching circuit, and removing sufficient sulphur from the regenerated solution to maintain the sulphide sulphur content of the leaching solution at a predetermined level upon the addition thereto of that portion of the regenerated anolyte not subjected to the chlorine gas treatment.

6. The process of claim 4 including the treatment of a portion of the fouled anolyte with barium sulphide to regenerate the oxidized sulphur salts back to the sulphide state for return to the leaching circuit and treating a portion of the fouled anolyte with chlorine gas to precipitate its contained antimony and sulphide sulphur as an oxide compound of antimony and elemental sulphur prior to discarding the chlorinated solution, separating the precipitated antimony from the elemental sulphur for return to the leaching circuit and removing sufficient sulphur by the chlorine gas treatment to maintain the sulphide sulphur concentration of the leaching solution at a predetermined level by the addition thereto of that portion of the fouled anolyte regenerated by barium sulphide and not subjected to the chlorine gas treatment.

7. In the process of claim 4 including the discarding of alkaline sulphide solutions of such low concentrations of both antimony and the alkaline sulphide that they can not be economically returned to the plant circuit, treating said solutions prior to their discard with chlorine gas for the precipitation of both their antimony and sulphide sulphur contents as an insoluble antimony oxide compound and elemental sulphur, and separation of the precipitate from the solution prior to its discard.

* * * * *